US008190992B2

(12) United States Patent
Tien et al.

(10) Patent No.: US 8,190,992 B2
(45) Date of Patent: May 29, 2012

(54) GROUPING AND DISPLAY OF LOGICALLY DEFINED REPORTS

(75) Inventors: Ian Tien, Seattle, WA (US); Robert Alan Blood, Duvall, WA (US); Corey Hulen, Sammamish, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/408,450

(22) Filed: Apr. 21, 2006

(65) Prior Publication Data

US 2007/0260625 A1 Nov. 8, 2007

(51) Int. Cl.
*G06F 17/21* (2006.01)

(52) U.S. Cl. ........................................................ 715/243

(58) Field of Classification Search .................. 715/200, 715/252, 243

See application file for complete search history.

(56) References Cited

U.S. PATENT DOCUMENTS

| | | | | |
|---|---|---|---|---|
| 5,018,077 | A | 5/1991 | Healey | 715/509 |
| 5,233,552 | A | 8/1993 | Brittan | 708/445 |
| 5,253,362 | A | 10/1993 | Nolan | 707/1 |
| 5,404,295 | A | 4/1995 | Katz et al. | 715/231 |
| 5,473,747 | A | 12/1995 | Bird | 715/848 |
| 5,615,347 | A | 3/1997 | Davis et al. | 715/833 |
| 5,675,553 | A | 10/1997 | O'Brien, Jr. et al. | 367/135 |
| 5,675,782 | A | 10/1997 | Montague et al. | 726/4 |
| 5,680,636 | A | 10/1997 | Levine | 715/512 |
| 5,758,351 | A | 5/1998 | Gibson et al. | 707/104 |
| 5,764,890 | A | 6/1998 | Glasser et al. | 726/11 |
| 5,779,566 | A | 7/1998 | Wilens | 473/407 |
| 5,797,136 | A | 8/1998 | Boyer et al. | 707/2 |
| 5,819,225 | A | 10/1998 | Eastwood et al. | 704/275 |
| 5,832,504 | A * | 11/1998 | Tripathi et al. | 715/235 |
| 5,838,313 | A | 11/1998 | Hou et al. | 715/201 |
| 5,845,270 | A | 12/1998 | Schatz | 706/11 |
| 5,877,758 | A | 3/1999 | Seybold | 715/866 |
| 5,911,143 | A | 6/1999 | Deinhart et al. | 1/1 |
| 5,926,794 | A | 7/1999 | Fethe | 705/11 |
| 5,941,947 | A | 8/1999 | Brown et al. | 709/225 |
| 5,943,666 | A | 8/1999 | Kleewein et al. | 1/1 |
| 5,956,691 | A | 9/1999 | Powers | 705/4 |
| 6,012,044 | A | 1/2000 | Maggioncalda et al. | 705/36 R |
| 6,023,714 | A * | 2/2000 | Hill et al. | 715/235 |

(Continued)

FOREIGN PATENT DOCUMENTS

EP 1128299 A1 8/2001

(Continued)

OTHER PUBLICATIONS

U.S. Official Action mailed Dec. 24, 2008 in U.S. Appl. No. 11/624,171.

(Continued)

*Primary Examiner* — Laurie Ries
*Assistant Examiner* — Frank D Mills
(74) *Attorney, Agent, or Firm* — Merchant & Gould

(57) ABSTRACT

Report views offer a user the ability to specify ancillary data views and also view that data in a scorecard viewing experience. A report view definition may be implemented as a metadata-based mapping of logical reports to physical reports for scorecards and KPIs. Reports are categorized based on their presentation size and/or type. Categorized report attributes included in the report view metadata are managed by a configuration UI. The report view metadata further includes schema, ordering capabilities, and mapping UI such as re-use of report views in multiple areas.

20 Claims, 10 Drawing Sheets

U.S. PATENT DOCUMENTS

| | | | | |
|---|---|---|---|---|
| 6,061,692 | A | 5/2000 | Thomas et al. | 707/613 |
| 6,115,705 | A | 9/2000 | Larson | 1/1 |
| 6,119,137 | A * | 9/2000 | Smith et al. | 715/234 |
| 6,141,655 | A | 10/2000 | Johnson | 707/2 |
| 6,163,779 | A | 12/2000 | Mantha | 707/100 |
| 6,182,022 | B1 | 1/2001 | Mayle et al. | 702/182 |
| 6,216,066 | B1 | 4/2001 | Goebel et al. | 701/29 |
| 6,226,635 | B1 | 5/2001 | Katariya | 1/1 |
| 6,230,310 | B1 * | 5/2001 | Arrouye et al. | 717/136 |
| 6,233,573 | B1 | 5/2001 | Bair | 707/3 |
| 6,249,784 | B1 | 6/2001 | Macke | 707/3 |
| 6,308,206 | B1 | 10/2001 | Singh | 709/223 |
| 6,321,206 | B1 | 11/2001 | Honarvar | 705/7 |
| 6,341,277 | B1 | 1/2002 | Coden et al. | 1/1 |
| 6,345,279 | B1 * | 2/2002 | Li et al. | 715/202 |
| 6,389,434 | B1 | 5/2002 | Rivette | 715/512 |
| 6,393,406 | B1 | 5/2002 | Eder | 705/7 |
| 6,421,670 | B1 | 7/2002 | Fourman | 707/10 |
| 6,463,431 | B1 | 10/2002 | Schmitt | 1/1 |
| 6,466,935 | B1 | 10/2002 | Stuart | 1/1 |
| 6,493,733 | B1 | 12/2002 | Pollack | 715/513 |
| 6,516,324 | B1 | 2/2003 | Jones | 707/104.1 |
| 6,519,603 | B1 | 2/2003 | Bays | 707/102 |
| 6,522,342 | B1 | 2/2003 | Gagnon et al. | 715/716 |
| 6,529,215 | B2 | 3/2003 | Golovchinsky et al. | 715/764 |
| 6,563,514 | B1 | 5/2003 | Samar | 715/711 |
| 6,578,004 | B1 | 6/2003 | Cimral | 705/7 |
| 6,601,233 | B1 | 7/2003 | Underwood | 717/102 |
| 6,604,084 | B1 | 8/2003 | Powers et al. | 705/11 |
| 6,606,627 | B1 | 8/2003 | Guthrie et al. | 1/1 |
| 6,628,312 | B1 | 9/2003 | Rao | 715/853 |
| 6,633,889 | B2 | 10/2003 | Dessloch et al. | 1/1 |
| 6,658,432 | B1 | 12/2003 | Warikoo et al. | 707/104.1 |
| 6,665,577 | B2 | 12/2003 | Onyshkevych et al. | 700/130 |
| 6,677,963 | B1 | 1/2004 | Mani et al. | 715/764 |
| 6,687,735 | B1 | 2/2004 | Logston et al. | 709/203 |
| 6,687,878 | B1 | 2/2004 | Eintracht | 712/512 |
| 6,728,724 | B1 | 4/2004 | Megiddo et al. | 1/1 |
| 6,763,134 | B2 | 7/2004 | Cooper et al. | 382/162 |
| 6,772,137 | B1 | 8/2004 | Hurwood et al. | 707/2 |
| 6,775,675 | B1 | 8/2004 | Nwabueze | 707/100 |
| 6,782,421 | B1 | 8/2004 | Soles et al. | 709/223 |
| 6,785,675 | B1 | 8/2004 | Graves et al. | 1/1 |
| 6,804,657 | B1 * | 10/2004 | Sultan | 705/7.31 |
| 6,831,575 | B2 | 12/2004 | Wu et al. | 341/50 |
| 6,831,668 | B2 | 12/2004 | Cras | 345/853 |
| 6,842,176 | B2 | 1/2005 | Sang'Udi | 345/473 |
| 6,850,891 | B1 | 2/2005 | Forman | 705/7 |
| 6,854,091 | B1 | 2/2005 | Beaudoin | 715/854 |
| 6,859,798 | B1 | 2/2005 | Bedell et al. | 706/45 |
| 6,867,764 | B2 | 3/2005 | Ludtke | 345/173 |
| 6,868,087 | B1 | 3/2005 | Agarwala et al. | 370/412 |
| 6,874,126 | B1 | 3/2005 | Lapidous | 715/711 |
| 6,898,603 | B1 | 5/2005 | Petculescu | 707/101 |
| 6,900,808 | B2 | 5/2005 | Lassiter | 345/440 |
| 6,901,426 | B1 | 5/2005 | Powers et al. | 709/203 |
| 6,917,921 | B1 | 7/2005 | Cimral et al. | 705/7 |
| 6,959,306 | B2 | 10/2005 | Nwabueze | 707/101 |
| 6,963,826 | B2 | 11/2005 | Hanaman et al. | 703/2 |
| 6,968,312 | B1 | 11/2005 | Jordan | 705/7 |
| 6,973,616 | B1 | 12/2005 | Cottrille | 715/512 |
| 6,976,086 | B2 | 12/2005 | Sadeghi et al. | 709/236 |
| 6,988,076 | B2 | 1/2006 | Ouimet | 705/7 |
| 6,995,768 | B2 | 2/2006 | Jou | 345/440 |
| 7,013,285 | B1 | 3/2006 | Rebane | 705/10 |
| 7,015,911 | B2 | 3/2006 | Shaughnessy et al. | 345/440 |
| 7,027,051 | B2 | 4/2006 | Alford et al. | 345/440 |
| 7,043,524 | B2 | 5/2006 | Shah et al. | 709/203 |
| 7,058,638 | B2 | 6/2006 | Singh | 707/100 |
| 7,065,784 | B2 | 6/2006 | Hopmann et al. | 726/4 |
| 7,079,010 | B2 | 7/2006 | Champlin | 340/286.02 |
| 7,158,628 | B2 | 1/2007 | McConnell et al. | 379/265.02 |
| 7,181,417 | B1 | 2/2007 | Langseth et al. | 705/26 |
| 7,200,595 | B2 | 4/2007 | Dutta et al. | 1/1 |
| 7,216,116 | B1 | 5/2007 | Nilsson et al. | 1/1 |
| 7,222,308 | B2 | 5/2007 | Sauermann et al. | 715/833 |
| 7,224,847 | B2 | 5/2007 | Zhang et al. | |
| 7,249,120 | B2 | 7/2007 | Bruno et al. | 1/1 |
| 7,275,024 | B2 | 9/2007 | Yeh et al. | 703/2 |
| 7,302,421 | B2 | 11/2007 | Aldridge | 1/1 |
| 7,302,431 | B1 | 11/2007 | Apollonsky et al. | 1/1 |
| 7,302,444 | B1 | 11/2007 | Dunmore et al. | 1/1 |
| 7,313,561 | B2 | 12/2007 | Lo et al. | 1/1 |
| 7,340,448 | B2 | 3/2008 | Santosuosso | 1/1 |
| 7,349,862 | B2 | 3/2008 | Palmer et al. | 705/7 |
| 7,349,877 | B2 | 3/2008 | Ballow et al. | 705/36 R |
| 7,359,865 | B1 | 4/2008 | Connor et al. | 705/10 |
| 7,383,247 | B2 | 6/2008 | Li et al. | 1/1 |
| 7,398,240 | B2 | 7/2008 | Ballow et al. | 705/35 |
| 7,406,431 | B2 | 7/2008 | Spira et al. | 705/7 |
| 7,409,357 | B2 | 8/2008 | Schaf et al. | 705/7 |
| 7,412,398 | B1 | 8/2008 | Bailey | 705/10 |
| 7,433,876 | B2 | 10/2008 | Spivack et al. | 1/1 |
| 7,440,976 | B2 | 10/2008 | Hart et al. | 707/203 |
| 7,454,393 | B2 | 11/2008 | Horvitz et al. | 706/46 |
| 7,496,852 | B2 | 2/2009 | Eichorn et al. | 715/764 |
| 7,496,857 | B2 | 2/2009 | Stata et al. | 715/833 |
| 7,509,343 | B1 | 3/2009 | Washburn et al. | 707/104.1 |
| 7,546,226 | B1 | 6/2009 | Yeh et al. | 703/2 |
| 7,546,246 | B1 | 6/2009 | Stamm et al. | 705/7 |
| 7,548,912 | B2 | 6/2009 | Gideoni et al. | 1/1 |
| 7,559,023 | B2 | 7/2009 | Hays et al. | 715/255 |
| 7,568,217 | B1 | 7/2009 | Prasad et al. | 726/3 |
| 7,587,665 | B2 | 9/2009 | Crow et al. | 715/212 |
| 7,587,755 | B2 | 9/2009 | Kramer | 726/4 |
| 7,599,848 | B2 | 10/2009 | Wefers et al. | 705/7 |
| 7,613,625 | B2 | 11/2009 | Heinrich | 705/7 |
| 7,617,177 | B2 | 11/2009 | Bukary et al. | 1/1 |
| 7,617,187 | B2 | 11/2009 | Zhu et al. | 715/243 |
| 7,630,965 | B1 | 12/2009 | Erickson et al. | 1/1 |
| 7,634,478 | B2 | 12/2009 | Yang et al. | 1/1 |
| 7,636,709 | B1 * | 12/2009 | Srikant et al. | 1/1 |
| 7,640,506 | B2 | 12/2009 | Pratley et al. | 715/751 |
| 7,660,731 | B2 | 2/2010 | Chaddha et al. | 705/8 |
| 7,667,582 | B1 | 2/2010 | Waldorf | 340/440 |
| 7,685,207 | B1 | 3/2010 | Helms | 707/790 |
| 7,694,270 | B2 | 4/2010 | Mankotia et al. | 717/101 |
| 7,698,349 | B2 | 4/2010 | Hulen et al. | 707/805 |
| 7,702,554 | B2 | 4/2010 | Ballow et al. | 705/35 |
| 7,702,779 | B1 | 4/2010 | Gupta et al. | 709/224 |
| 7,707,490 | B2 | 4/2010 | Hays et al. | 715/234 |
| 7,716,253 | B2 | 5/2010 | Netz et al. | 707/803 |
| 7,716,278 | B2 | 5/2010 | Beringer et al. | 709/203 |
| 7,716,571 | B2 | 5/2010 | Tien et al. | 715/212 |
| 7,716,592 | B2 | 5/2010 | Tien et al. | 715/744 |
| 7,725,947 | B2 | 5/2010 | Bukary et al. | 726/30 |
| 7,730,023 | B2 | 6/2010 | MacGregor | 707/603 |
| 7,730,123 | B1 | 6/2010 | Erickson et al. | 709/203 |
| 7,739,148 | B2 | 6/2010 | Suzuki et al. | 705/26 |
| 7,747,572 | B2 | 6/2010 | Scott et al. | 707/636 |
| 7,752,094 | B2 | 7/2010 | Davidson et al. | 705/31 |
| 7,752,301 | B1 | 7/2010 | Maiocco et al. | 709/224 |
| 7,778,910 | B2 | 8/2010 | Ballow et al. | 705/36 R |
| 7,788,280 | B2 | 8/2010 | Singh et al. | 707/791 |
| 7,792,774 | B2 | 9/2010 | Friedlander et al. | 706/47 |
| 7,822,662 | B2 | 10/2010 | Guzik et al. | 705/35 |
| 7,831,464 | B1 | 11/2010 | Nichols et al. | 705/7.39 |
| 7,840,896 | B2 | 11/2010 | Tien et al. | 715/243 |
| 7,848,947 | B1 * | 12/2010 | McGloin et al. | 705/7.42 |
| 7,899,833 | B2 | 3/2011 | Stevens et al. | |
| 7,899,843 | B2 | 3/2011 | Dettinger et al. | |
| 7,904,797 | B2 | 3/2011 | Wong et al. | |
| 8,126,750 | B2 | 2/2012 | Tien et al. | |
| 2001/0004256 | A1 * | 6/2001 | Iwata et al. | 345/204 |
| 2001/0051835 | A1 | 12/2001 | Cline | 700/91 |
| 2001/0054046 | A1 * | 12/2001 | Mikhailov et al. | 707/500 |
| 2002/0029273 | A1 | 3/2002 | Haroldson et al. | 709/226 |
| 2002/0038217 | A1 | 3/2002 | Young | 705/1 |
| 2002/0049621 | A1 | 4/2002 | Bruce | 705/7 |
| 2002/0052740 | A1 | 5/2002 | Charlesworth | 704/220 |
| 2002/0052862 | A1 | 5/2002 | Scott et al. | 707/1 |
| 2002/0059267 | A1 | 5/2002 | Shah | 707/100 |
| 2002/0078175 | A1 | 6/2002 | Wallace | 709/200 |
| 2002/0087272 | A1 | 7/2002 | Mackie | 702/14 |
| 2002/0091737 | A1 * | 7/2002 | Markel | 707/513 |
| 2002/0099578 | A1 * | 7/2002 | Eicher et al. | 705/7 |
| 2002/0099678 | A1 | 7/2002 | Albright et al. | 706/45 |

| | | | | |
|---|---|---|---|---|
| 2002/0103976 | A1 | 8/2002 | Steely et al. | 711/135 |
| 2002/0112171 | A1 | 8/2002 | Ginter et al. | 713/185 |
| 2002/0133368 | A1 | 9/2002 | Strutt et al. | 705/1 |
| 2002/0147803 | A1 | 10/2002 | Dodd et al. | 709/223 |
| 2002/0161614 | A1 | 10/2002 | Spira et al. | 705/7 |
| 2002/0169658 | A1 | 11/2002 | Adler | 705/10 |
| 2002/0169799 | A1 | 11/2002 | Voshell | 707/503 |
| 2002/0177784 | A1 | 11/2002 | Shekhar | 600/519 |
| 2002/0178119 | A1 | 11/2002 | Griffin et al. | 705/54 |
| 2002/0184043 | A1 | 12/2002 | Lavorgna et al. | 705/1 |
| 2002/0184061 | A1 | 12/2002 | Digate et al. | 705/7 |
| 2002/0188513 | A1 | 12/2002 | Gil et al. | 705/22 |
| 2002/0194042 | A1 | 12/2002 | Sands | 705/7 |
| 2002/0194090 | A1 | 12/2002 | Gagnon et al. | 705/27 |
| 2002/0194329 | A1 | 12/2002 | Alling | 709/224 |
| 2002/0198985 | A1 | 12/2002 | Fraenkel et al. | 709/224 |
| 2003/0004742 | A1* | 1/2003 | Palmer et al. | 705/1 |
| 2003/0014290 | A1 | 1/2003 | McLean et al. | 705/7 |
| 2003/0014488 | A1 | 1/2003 | Dalal et al. | 709/204 |
| 2003/0028419 | A1 | 2/2003 | Monaghan | 705/10 |
| 2003/0033191 | A1 | 2/2003 | Davies et al. | 705/10 |
| 2003/0040936 | A1* | 2/2003 | Nader et al. | 705/1 |
| 2003/0055731 | A1 | 3/2003 | Fouraker et al. | 705/22 |
| 2003/0055927 | A1 | 3/2003 | Fischer et al. | 709/221 |
| 2003/0061132 | A1 | 3/2003 | Yu et al. | 705/30 |
| 2003/0065604 | A1 | 4/2003 | Gatto | 705/36 |
| 2003/0065605 | A1 | 4/2003 | Gatto | 705/36 |
| 2003/0069773 | A1 | 4/2003 | Hladik et al. | 705/7 |
| 2003/0069824 | A1 | 4/2003 | Menninger | 705/37 |
| 2003/0071814 | A1 | 4/2003 | Jou et al. | 345/440 |
| 2003/0078830 | A1 | 4/2003 | Wagner et al. | |
| 2003/0093423 | A1* | 5/2003 | Larason et al. | 707/5 |
| 2003/0110249 | A1 | 6/2003 | Buus et al. | 709/224 |
| 2003/0144868 | A1 | 7/2003 | MacIntyre et al. | 705/1 |
| 2003/0146937 | A1 | 8/2003 | Lee | 715/783 |
| 2003/0149696 | A1 | 8/2003 | Nelson et al. | |
| 2003/0182181 | A1 | 9/2003 | Kirkwood | 705/11 |
| 2003/0187675 | A1* | 10/2003 | Hack et al. | 705/1 |
| 2003/0195878 | A1 | 10/2003 | Neumann | 707/3 |
| 2003/0204430 | A1 | 10/2003 | Kalmick et al. | 705/8 |
| 2003/0204487 | A1 | 10/2003 | Sssv | 707/1 |
| 2003/0212960 | A1* | 11/2003 | Shaughnessy et al. | 715/526 |
| 2003/0225604 | A1 | 12/2003 | Casati et al. | 705/7 |
| 2003/0226107 | A1 | 12/2003 | Pelegri-Llopart | 707/501.1 |
| 2003/0236732 | A1 | 12/2003 | Cimral et al. | 705/36 |
| 2004/0021695 | A1 | 2/2004 | Sauermann et al. | 345/789 |
| 2004/0030741 | A1 | 2/2004 | Wolton et al. | 709/202 |
| 2004/0030795 | A1 | 2/2004 | Hesmer et al. | 709/231 |
| 2004/0033475 | A1 | 2/2004 | Mizuma et al. | 434/219 |
| 2004/0044665 | A1 | 3/2004 | Nwabueze | 707/9 |
| 2004/0044678 | A1 | 3/2004 | Kalia et al. | 707/102 |
| 2004/0059518 | A1 | 3/2004 | Rothschild | 702/18 |
| 2004/0064293 | A1 | 4/2004 | Hamilton et al. | 702/182 |
| 2004/0066782 | A1 | 4/2004 | Nassar | 370/389 |
| 2004/0068429 | A1 | 4/2004 | MacDonald | 705/10 |
| 2004/0068431 | A1 | 4/2004 | Smith et al. | 705/10 |
| 2004/0083246 | A1 | 4/2004 | Kahlouche et al. | 708/105 |
| 2004/0093296 | A1 | 5/2004 | Phelan et al. | 705/36 R |
| 2004/0102926 | A1* | 5/2004 | Adendorff et al. | 702/182 |
| 2004/0117731 | A1* | 6/2004 | Blyashov | 715/507 |
| 2004/0119752 | A1 | 6/2004 | Berringer et al. | 345/779 |
| 2004/0128150 | A1 | 7/2004 | Lundegren | 705/1 |
| 2004/0135825 | A1 | 7/2004 | Brosnan | 345/860 |
| 2004/0138944 | A1 | 7/2004 | Whitacre | 705/11 |
| 2004/0162772 | A1 | 8/2004 | Lewis | 705/34 |
| 2004/0164983 | A1 | 8/2004 | Khozai | 345/440 |
| 2004/0172323 | A1 | 9/2004 | Stamm | 705/10 |
| 2004/0183800 | A1 | 9/2004 | Peterson | 345/440 |
| 2004/0199541 | A1 | 10/2004 | Goldberg et al. | 707/104.1 |
| 2004/0204913 | A1 | 10/2004 | Mueller et al. | 702/188 |
| 2004/0210574 | A1 | 10/2004 | Aponte et al. | 707/5 |
| 2004/0212636 | A1 | 10/2004 | Stata et al. | 345/703 |
| 2004/0215626 | A1 | 10/2004 | Colossi et al. | 715/500 |
| 2004/0225571 | A1 | 11/2004 | Urali | 705/26 |
| 2004/0225955 | A1 | 11/2004 | Ly | 715/500 |
| 2004/0230463 | A1 | 11/2004 | Boivin | 705/7 |
| 2004/0230471 | A1* | 11/2004 | Putnam Brookes | 705/10 |
| 2004/0249482 | A1 | 12/2004 | Abu El Ata et al. | 700/44 |
| 2004/0249657 | A1 | 12/2004 | Kol et al. | 705/1 |
| 2004/0252134 | A1 | 12/2004 | Bhatt et al. | 345/619 |
| 2004/0254806 | A1 | 12/2004 | Schwerin-Wenzel et al. | 705/1 |
| 2004/0254860 | A1 | 12/2004 | Wagner et al. | 705/27 |
| 2004/0260582 | A1 | 12/2004 | King | 705/7 |
| 2004/0260717 | A1 | 12/2004 | Albornoz et al. | 707/102 |
| 2004/0268228 | A1 | 12/2004 | Croney et al. | 715/255 |
| 2005/0004781 | A1 | 1/2005 | Price et al. | 702/188 |
| 2005/0012743 | A1 | 1/2005 | Kapler et al. | 345/419 |
| 2005/0039119 | A1 | 2/2005 | Parks et al. | 715/515 |
| 2005/0049831 | A1 | 3/2005 | Lilly | 702/182 |
| 2005/0049894 | A1 | 3/2005 | Cantwell et al. | 705/1 |
| 2005/0055257 | A1 | 3/2005 | Senturk et al. | 705/8 |
| 2005/0060048 | A1* | 3/2005 | Pierre et al. | 700/28 |
| 2005/0060325 | A1 | 3/2005 | Bakalash | 707/100 |
| 2005/0065925 | A1 | 3/2005 | Weissman et al. | 707/4 |
| 2005/0065930 | A1* | 3/2005 | Swaminathan et al. | 707/6 |
| 2005/0065967 | A1 | 3/2005 | Schuetze et al. | 707/102 |
| 2005/0071680 | A1 | 3/2005 | Bukary et al. | 713/201 |
| 2005/0071737 | A1* | 3/2005 | Adendorff et al. | 715/500 |
| 2005/0091093 | A1 | 4/2005 | Bhaskaran | 705/7 |
| 2005/0091253 | A1 | 4/2005 | Cragun | 707/102 |
| 2005/0091263 | A1 | 4/2005 | Wallace | 707/104.1 |
| 2005/0097438 | A1* | 5/2005 | Jacobson | 715/500.1 |
| 2005/0097517 | A1 | 5/2005 | Goin et al. | 717/124 |
| 2005/0108271 | A1 | 5/2005 | Hurmiz et al. | 707/102 |
| 2005/0114241 | A1 | 5/2005 | Hirsch | 705/35 |
| 2005/0114801 | A1 | 5/2005 | Yang | 715/961 |
| 2005/0144022 | A1 | 6/2005 | Evans | 705/1 |
| 2005/0149558 | A1 | 7/2005 | Zhuk | 707/104.1 |
| 2005/0149852 | A1 | 7/2005 | Bleicher | 715/501.1 |
| 2005/0154628 | A1 | 7/2005 | Eckart et al. | 705/10 |
| 2005/0154635 | A1 | 7/2005 | Wright et al. | 705/11 |
| 2005/0154769 | A1 | 7/2005 | Eckart et al. | 707/201 |
| 2005/0160356 | A1 | 7/2005 | Albornoz | 715/512 |
| 2005/0171835 | A1 | 8/2005 | Mook | 705/11 |
| 2005/0181835 | A1 | 8/2005 | Lau et al. | 455/567 |
| 2005/0197946 | A1 | 9/2005 | Williams et al. | 705/36 |
| 2005/0198042 | A1* | 9/2005 | Davis | 707/10 |
| 2005/0203876 | A1 | 9/2005 | Cragun et al. | 707/3 |
| 2005/0209943 | A1 | 9/2005 | Ballow et al. | 705/35 |
| 2005/0209945 | A1 | 9/2005 | Ballow et al. | 705/35 |
| 2005/0209946 | A1 | 9/2005 | Ballow et al. | 705/35 |
| 2005/0209948 | A1 | 9/2005 | Ballow et al. | 705/36 |
| 2005/0210052 | A1 | 9/2005 | Aldridge | 707/101 |
| 2005/0216831 | A1* | 9/2005 | Guzik et al. | 715/513 |
| 2005/0228880 | A1 | 10/2005 | Champlin | 709/224 |
| 2005/0240467 | A1 | 10/2005 | Eckart | 705/10 |
| 2005/0240898 | A1 | 10/2005 | Manikotia et al. | 717/101 |
| 2005/0256825 | A1 | 11/2005 | Dettinger | 707/1 |
| 2005/0262051 | A1 | 11/2005 | Dettinger et al. | 707/3 |
| 2005/0262451 | A1 | 11/2005 | Remignanti et al. | 715/833 |
| 2005/0272022 | A1 | 12/2005 | Montz, Jr. et al. | 434/322 |
| 2005/0273762 | A1 | 12/2005 | Lesh | 715/115 |
| 2005/0289452 | A1 | 12/2005 | Kashi | 715/512 |
| 2006/0004555 | A1 | 1/2006 | Jones | 703/6 |
| 2006/0004731 | A1 | 1/2006 | Seibel et al. | 707/3 |
| 2006/0009990 | A1 | 1/2006 | McCormick | 705/1 |
| 2006/0010032 | A1 | 1/2006 | Eicher et al. | 705/10 |
| 2006/0010164 | A1 | 1/2006 | Netz et al. | 707/104.1 |
| 2006/0020531 | A1 | 1/2006 | Veeneman et al. | 705/35 |
| 2006/0026179 | A1 | 2/2006 | Brown et al. | 707/100 |
| 2006/0036455 | A1 | 2/2006 | Prasad | 715/1 |
| 2006/0036595 | A1 | 2/2006 | Gilfix et al. | 707/5 |
| 2006/0047419 | A1 | 3/2006 | Diendorf et al. | 701/208 |
| 2006/0059107 | A1 | 3/2006 | Elmore et al. | 705/64 |
| 2006/0074789 | A1 | 4/2006 | Capotosto et al. | 705/35 |
| 2006/0080156 | A1 | 4/2006 | Baughn et al. | 705/7 |
| 2006/0085444 | A1 | 4/2006 | Sarawgi et al. | 707/100 |
| 2006/0089868 | A1 | 4/2006 | Griller et al. | 705/10 |
| 2006/0089894 | A1 | 4/2006 | Balk et al. | 705/35 |
| 2006/0089939 | A1 | 4/2006 | Broda et al. | 707/100 |
| 2006/0095276 | A1 | 5/2006 | Axelrod et al. | 705/1 |
| 2006/0095915 | A1 | 5/2006 | Clater | 718/100 |
| 2006/0111921 | A1 | 5/2006 | Chang et al. | 705/1 |
| 2006/0112123 | A1 | 5/2006 | Clark et al. | 707/101 |
| 2006/0112130 | A1 | 5/2006 | Lowson | 707/102 |
| 2006/0123022 | A1 | 6/2006 | Bird | 707/100 |
| 2006/0136830 | A1 | 6/2006 | Martlage et al. | 715/745 |
| 2006/0154692 | A1 | 7/2006 | Ikehara et al. | 455/556.2 |

| | | | | |
|---|---|---|---|---|
| 2006/0161471 | A1 | 7/2006 | Hulen et al. | 705/10 |
| 2006/0161596 | A1 | 7/2006 | Chan et al. | 707/201 |
| 2006/0167704 | A1 | 7/2006 | Nicholls et al. | 705/1 |
| 2006/0178897 | A1 | 8/2006 | Fuchs | 705/1 |
| 2006/0178920 | A1 | 8/2006 | Muell | 705/8 |
| 2006/0195424 | A1 | 8/2006 | Wiest et al. | 707/3 |
| 2006/0206392 | A1 | 9/2006 | Rice, Jr. et al. | 705/26 |
| 2006/0224325 | A1 | 10/2006 | Conway et al. | 702/19 |
| 2006/0229925 | A1 | 10/2006 | Chalasani et al. | 705/8 |
| 2006/0230234 | A1 | 10/2006 | Bentolila et al. | 711/133 |
| 2006/0233348 | A1 | 10/2006 | Cooper | 379/265.06 |
| 2006/0235732 | A1 | 10/2006 | Miller et al. | 705/7 |
| 2006/0235778 | A1 | 10/2006 | Razvi et al. | 705/35 |
| 2006/0253475 | A1 | 11/2006 | Stewart et al. | 707/100 |
| 2006/0259338 | A1 | 11/2006 | Rodrigue et al. | 705/7 |
| 2006/0265377 | A1 | 11/2006 | Raman et al. | 707/9 |
| 2006/0271583 | A1 | 11/2006 | Hulen et al. | 707/102 |
| 2006/0282819 | A1 | 12/2006 | Graham et al. | 717/113 |
| 2006/0288211 | A1 | 12/2006 | Vargas et al. | 713/170 |
| 2007/0021992 | A1 | 1/2007 | Konakalla | 705/7 |
| 2007/0022026 | A1 | 1/2007 | Davidson et al. | 705/31 |
| 2007/0033129 | A1 | 2/2007 | Coates | 705/36 R |
| 2007/0038934 | A1 | 2/2007 | Fellman | 715/700 |
| 2007/0050237 | A1 | 3/2007 | Tien et al. | 705/11 |
| 2007/0055564 | A1 | 3/2007 | Fourman | 705/11 |
| 2007/0055688 | A1 * | 3/2007 | Blattner | 707/102 |
| 2007/0067381 | A1 | 3/2007 | Grant et al. | 709/200 |
| 2007/0112607 | A1 | 5/2007 | Tien et al. | 705/7 |
| 2007/0143161 | A1 | 6/2007 | Tien et al. | 705/7 |
| 2007/0143174 | A1 | 6/2007 | Tien et al. | 705/11 |
| 2007/0143175 | A1 | 6/2007 | Tien et al. | 705/11 |
| 2007/0156680 | A1 | 7/2007 | Tien et al. | 707/6 |
| 2007/0168323 | A1 | 7/2007 | Dickerman et al. | 707/2 |
| 2007/0174330 | A1 * | 7/2007 | Fox et al. | 707/102 |
| 2007/0225986 | A1 | 9/2007 | Bowe et al. | 705/1 |
| 2007/0234198 | A1 | 10/2007 | Tien et al. | 715/512 |
| 2007/0239508 | A1 | 10/2007 | Fazal et al. | 705/8 |
| 2007/0239573 | A1 | 10/2007 | Tien et al. | 705/35 |
| 2007/0239660 | A1 | 10/2007 | Tien et al. | 707/2 |
| 2007/0254740 | A1 | 11/2007 | Tien et al. | 463/42 |
| 2007/0255681 | A1 | 11/2007 | Tien et al. | 707/2 |
| 2007/0265863 | A1 | 11/2007 | Tien et al. | 705/1 |
| 2007/0266042 | A1 | 11/2007 | Hsu et al. | 707/102 |
| 2007/0282673 | A1 | 12/2007 | Nagpal et al. | 705/11 |
| 2008/0005064 | A1 | 1/2008 | Sarukkai | 707/3 |
| 2008/0040309 | A1 | 2/2008 | Aldridge | 707/1 |
| 2008/0059441 | A1 | 3/2008 | Gaug et al. | 707/4 |
| 2008/0086345 | A1 | 4/2008 | Wilson et al. | 705/7 |
| 2008/0086359 | A1 | 4/2008 | Holton et al. | 705/10 |
| 2008/0109270 | A1 | 5/2008 | Shepherd et al. | 705/7 |
| 2008/0115103 | A1 | 5/2008 | Datars et al. | 717/101 |
| 2008/0140623 | A1 | 6/2008 | Tien et al. | 707/3 |
| 2008/0162209 | A1 | 7/2008 | Gu et al. | 705/7 |
| 2008/0162210 | A1 | 7/2008 | Gu et al. | 705/7 |
| 2008/0163066 | A1 | 7/2008 | Gu et al. | 715/738 |
| 2008/0163099 | A1 | 7/2008 | Gu et al. | 715/780 |
| 2008/0163125 | A1 | 7/2008 | Gu et al. | 715/853 |
| 2008/0163164 | A1 | 7/2008 | Chowdhary et al. | 717/106 |
| 2008/0168376 | A1 | 7/2008 | Tien et al. | 715/772 |
| 2008/0172287 | A1 | 7/2008 | Tien et al. | 705/10 |
| 2008/0172348 | A1 | 7/2008 | Tien et al. | 706/12 |
| 2008/0172414 | A1 | 7/2008 | Tien et al. | 707/104.1 |
| 2008/0172629 | A1 | 7/2008 | Tien et al. | 715/771 |
| 2008/0183564 | A1 | 7/2008 | Tien et al. | 705/11 |
| 2008/0184099 | A1 | 7/2008 | Tien et al. | 715/209 |
| 2008/0184130 | A1 | 7/2008 | Tien et al. | 715/745 |
| 2008/0189632 | A1 | 8/2008 | Tien et al. | 715/764 |
| 2008/0189724 | A1 | 8/2008 | Tien et al. | 719/329 |
| 2008/0243597 | A1 | 10/2008 | Ballow et al. | 705/11 |
| 2008/0288889 | A1 | 11/2008 | Hunt et al. | 705/810 |
| 2009/0300110 | A1 | 12/2009 | Chene et al. | 709/203 |
| 2010/0262659 | A1 | 10/2010 | Christiansen et al. | 709/205 |

FOREIGN PATENT DOCUMENTS

| | | | |
|---|---|---|---|
| EP | 1050829 | A2 | 3/2006 |
| WO | WO 97/31320 | A1 | 8/1997 |
| WO | WO0165349 | | 9/2001 |
| WO | WO0169421 | A2 | 9/2001 |
| WO | WO0169421 | A3 | 9/2001 |
| WO | WO 03/037019 | A1 | 5/2003 |
| WO | WO 01/01206 | A2 | 1/2004 |
| WO | WO 01/01206 | A3 | 1/2004 |
| WO | WO 2004/114177 | A2 | 12/2004 |
| WO | WO 2004/114177 | A3 | 12/2004 |
| WO | WO 2005/062201 | A1 | 7/2005 |
| WO | WO 2005/072410 | A2 | 8/2005 |
| WO | WO 2005/101233 | A1 | 10/2005 |

OTHER PUBLICATIONS

Extend Business Scorecard Manager 2005, http://www.proclarity.com/products/clients_scorecardmanager.asp.

MicroStrategy 8, http://microstrategy.com/Download/files/news/Press/MicroStrategy8_Overview.pdf.

OutlookSoft Corporate Performance Management: A Unified, Microsoft-Based CPM Solution, http://www.outlooksoft.com/product/index.htm.

Cognos 8 Business Intelligence, http://www.cognos.com/products/cognos8businessintelligence/index.html.

Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.

"Data Driven Components," Java Developers Journal, SYS-CON Media, Inc. 2004, http://www2.sys-con.com/itsg/virtualed/Java/archives/0405/hyrkas/index.html, 7 pp.

"Hyperion Intelligence Desktop, Plugin, and HTML Client Products," Hyperion™ Developer Network, http://dev.hyperion.com/resource_library/articles/intelligence_desktop_article.cfm, 7 pp.

"BusinessObjects Enterprise 6," An End-to-End Overview, White Paper., http://www.spain.businessobjects.com/global/pdf/products/queryanalysis/wp_e6_overview.pdf, 20 pp.

"Cognos 8 Business Intelligence—Dashboards," COGNOS® The Next Level of Performance, http://www.cognos.com/products/cognos8businessintelligence/dashboards.html, 2 pp.

"Microsoft Builds Business Intelligence Into Office Software," Microsoft PressPass—Information for Journalists, http://www.microsoft.com/presspass/press/2005/oct05/10-23BiLalunchPR.mspx, 4 pp.

"Hyperion System $_9$ BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.

"Products: PilotWorks," Products: PilotWorks—Scorecard, 2006 Pilot Software, pp. 1-3.

"Reveleus Business Analytics," Reveleus, an i-flex businedss, pp. 1-4.

Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp.

"Crystal Xcelsius Workgroup." http://www.xcelsius.com/Products/Enterprise_feastures.html, 3 pp.

"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16.

"BusinessObjects Plan Dashboarding XI for Retail," BusinessObjects, http://www.businessobjects.com/pdf/products/planning/plan_dashboarding_rt.pdf, 2 pp.

"SAS® Risk Intelligence Offerings, Risk Reporting; Data Integration; Internal Risk Ratings; Credit Risk; Market Risk; Operational Risk", http://www.sas.com/industry/fsi/risk/brochure2.pdf, 12 pp.

Tenhunen, Jarkko; Ukko, Juhani; Markus, Tapio; Rantanen, Hannu; "Applying Balanced Scorecard Principles On the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp.

Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.
Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.
U.S. Office Action mailed Jul. 25, 2008 cited in U.S. Appl. No. 11/412,434.
U.S. Office Action mailed Sep. 5, 2008 cited in U.S. Appl. No. 11/280,548.
U.S. Office Action dated Nov. 24, 2008 cited in U.S. Appl. No. 11/214,678.
U.S. Office Action dated Feb. 18, 2009 cited in U.S. Appl. No. 11/412,434.
U.S. Appl. No. 11/039,714, filed Jan. 1, 2005 entitled "System and Method for Multi-Dimensional Average-Weighted Banding Status and Scoring".
U.S. Appl. No. 11/214,678, filed Aug. 30, 2005 entitled "Visual Designer for Multi-Dimensional Business Logic".
U.S. Appl. No. 11/280,548, filed Nov. 16, 2005 entitled "Score-Based Alerting in Business Logic".
U.S. Appl. No. 11/313,899, filed Dec. 21, 2005 entitled "Centralized Model for Coordinating Update of Multiple Reports".
U.S. Appl. No. 11/313,327, filed Dec. 21 2005 entitled "Repeated Inheritance of Heterogeneous Business Metrics".
U.S. Appl. No. 11/313,390, filed Dec. 21, 2005 entitled "Disconnected Authoring of Business Definitions".
U.S. Appl. No. 11/313,324, filed Dec. 21, 2005 entitled "Application Independent Rendering of Scorecard Metrics".
U.S. Appl. No. 11/393,115, filed Mar. 30, 2006 entitled "Definition and Instantiation of Metric Based Business Logic Reports".
U.S. Appl. No. 11/393,019, filed Mar. 30, 2006 entitled "Automated Generation of Dashboards for Scorecard Metrics and Subordinate Reporting".
U.S. Appl. No. 11/393,335, filed Mar. 30, 2006 entitled "MultiDimensional Metrics-Based Annotation".
U.S. Appl. No. 11/412,434, filed Apr. 27, 2006 entitled "Multidimensional Scorecard Header Definition".
U.S. Appl. No. 11/412,499, filed Apr. 27, 2006 entitled "Automated Determination of Relevant Slice in Multidimensional Data Sources".
U.S. Appl. No. 11/412,458, filed Apr. 27, 2006 entitled "Concerted Coordination of Multi-Dimensional Scorecards".
Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.
"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.
Ferguson, Mike, "Conquering CPM and Business Intelligence", Business Intelligence.com, ITNews265, http://www.businessintelligence.com/ex/asp.code.21/xe/article.htm, printed Jan. 11, 2006, 6 pp.
Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.
Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.
"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.
Bajwa, Deepinder S. et al., "An Empirical Assessment of the Adoption and Use of Collaboration Information Technologies in the U.S., Australia, and Hong Kong", http://dsslab.sims.monash.edu,au/dss2004/proceedings/pdf/07_Bajwa_Lewis_Pervan_Lai.pdf, printed Jan. 12, 2006, copyright 2004, pp. 60-69.
Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journal,827,2337;linkingpublicationresults,1:105633,1, printed Jan. 12, 2006, 2 pp.
Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.
Bird, Steven et al., "Annotation Graphs as a Framework for Multidimensional Linguistic Data Analysis", http:///acl.ldc.upenn.educ/W/W99/W99-0301.pdf, printed Jan. 12, 2006, pp. 1-10.
"SBM Solutions: Product Guide", SBM Associates, http://www.productcosting.com/prodguide.htm, printed Feb. 28, 2006, 1 pp.
"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.
"The Balanced Scorecard", http://cc.msncache.com/cache.aspx?q=2846702033267&lang=en-US&mkt=en-US&FORM=CVRE3, 4 pp.
Elmanova, Natalia, "Implementing OLAP In Delphi Applications", http://www.only4gurus.net/miscellaneous/implementing_olap_in_delphi_a.doc, printed Mar. 6, 2006, 19 pp.
Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.
"Business Analysis with OLAP", Netways, http://www.netways.com/newsletter.olap.html, printed Mar. 7, 2006, 3 pp.
"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.
"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.
"Scorecarding with Cognos® Metrics Manager", Cognos, http://www.cognos.com/pdfs/factsheets/fs_scorcarding_with_cognos_metrics_manager.pdf, printed Mar. 7, 2006, 4 pp.
"CorVu Products", Seabrook, http://www.seabrook.ie/corvu.htm#corvurapidscorecard, printed Mar. 7, 2006, 3 pp.
U.S. Official Action mailed May 28, 2009 in U.S. Appl. No. 11/280,548.
U.S. Official Action mailed Jun. 3, 2009 in U.S. Appl. No. 11/393,335.
U.S. Official Action mailed May 28, 2009 in U.S. Appl. No. 11/214,678.
U.S. Official Action mailed Aug. 6, 2009 in U.S. Appl. No. 11/668,520.
U.S. Official Action mailed Aug. 19, 2009 in U.S. Appl. No. 11/393,115.
U.S. Official Action mailed Sep. 1, 2009 in U.S. Appl. No. 11/412,434.
U.S. Official Action mailed Sep. 2, 2009 in U.S. Appl. No. 11/624,171.
U.S. Official Action mailed Sep. 30, 2009 in U.S. Appl. No. 11/214,678.
Kraynak, "Absolute Beginner's Guide to Microsoft Office Excel 2003", Que, Sep. 2003, 32 pp.
U.S. Official Action mailed Oct. 21, 2009 in U.S. Appl. No. 11/280,548.
U.S. Official Action mailed Dec. 8, 2009 in U.S. Appl. No. 11/393,335.
U.S. Official Action mailed Dec. 14, 2009 in U.S. Appl. No. 11/393,019.
U.S. Official Action mailed Dec. 28, 2009 in U.S. Appl. No. 11/624,171.
U.S. Official Action mailed Jan. 6, 2011 in U.S. Appl. No. 11/313,324.

U.S. Official Action mailed Jan. 11, 2011 in U.S. Appl. No. 11/412,458.
U.S. Official Action mailed Jan. 22, 2010 in U.S. Appl. No. 11/039,714.
U.S. Official Action mailed Feb. 3, 2010 in U.S. Appl. No. 11/668,530.
U.S. Official Action mailed Jan. 25, 2011 in U.S. Appl. No. 11/280,548.
U.S. Official Action mailed Feb. 1, 2011 in U.S. Appl. No. 11/670,516.
U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed Mar. 17, 2010 in U.S. Appl. No. 11/280,548.
U.S. Official Action mailed Mar. 25, 2010 in U.S. Appl. No. 11/393,115.
U.S. Official Action mailed Mar. 30, 2010 in U.S. Appl. No. 11/313,390.
U.S. Official Action mailed Mar. 31, 2010 in U.S. Appl. No. 11/313,327.
U.S. Official Action mailed Apr. 1, 2010 in U.S. Appl. No. 11/313,899.
U.S. Official Action mailed Apr. 7, 2010 in U.S. Appl. No. 11/412,499.
U.S. Official Action mailed Apr. 1, 2011 in U.S. Appl. No. 11/313,899.
U.S. Official Action mailed Apr. 4, 2011 in U.S. Appl. No. 11/624,171.
U.S. Official Action mailed Apr. 12, 2011 in U.S. Appl. No. 11/623,953.
U.S. Official Action mailed May 10, 2011 in U.S. Appl. No. 11/393,335.
U.S. Official Action mailed Apr. 14, 2010 in U.S. Appl. No. 11/313,324.
U.S. Official Action mailed Apr. 15, 2010 in U.S. Appl. No. 11/412,458.
U.S. Official Action mailed Apr. 23, 2010 in U.S. Appl. No. 11/214,678.
U.S. Official Action mailed May 12, 2010 in U.S. Appl. No. 11/624,171.
U.S. Official Action mailed May 26, 2010 in U.S. Appl. No. 11/393,335.
U.S. Official Action mailed May 26, 2010 in U.S. Appl. No. 11/668,520.
U.S. Official Action mailed Jul. 21, 2010 in U.S. Appl. No. 11/039,714.
U.S. Official Action mailed Aug. 4, 2010 in U.S. Appl. No. 11/280,548.
U.S. Official Action mailed Aug. 5, 2010 in U.S. Appl. No. 11/412,458.
U.S. Official Action mailed Aug. 10, 2010 in U.S. Appl. No. 11/623,818.
IBM WebSphere: Chapter 6—Working with WebSphere Business Modeler, cited in U.S. Appl. No. 11/313,390 in OA dated Sep. 1, 2010, 20 pgs.
U.S. Official Action mailed Aug. 30, 2010 in U.S. Appl. No. 11/313,327.
U.S. Official Action mailed Sep. 1, 2010 in U.S. Appl. No. 11/313,390.
U.S. Official Action mailed Sep. 8, 2010 in U.S. Appl. No. 11/670,516.
U.S. Official Action mailed Sep. 9, 2010 in U.S. Appl. No. 11/412,499.
U.S. Official Action mailed Sep. 29, 2010 in U.S. Appl. No. 11/313,324.
U.S. Official Action mailed Oct. 6, 2010 in U.S. Appl. No. 11/313,899.
U.S. Official Action mailed Oct. 12, 2010 in U.S. Appl. No. 11/623,953.
Monson et al., "IBM Workplace for Business Controls and Reporting: Administration and Operations Best Practices", IBM Redpaper, Oct. 2005, pp. 1-240.
"Cognos Business Intelligence Series 7, Cognos Impromptu (2006), Mastering Impromptu Reports", Cognos Incorporated, pp. 1-154.
"Cognos Series 7 PowerPlay Transformer", (2003), Installation Guide, Cognos Incorporated, pp. 1-62.
"Cognos Business Intelligence Series Cognos PowerPlay for Windows (2006), Discovering PowerPlay", Cognos Incorporated, pp. 1-74.
"Cognos Business Intelligence Series 7 PowerPlay for Windows", (2006), PowerPlay User Guide, Cognos Incorporated, pp. 1-230.
"Epicor Vantage: Introducing the Next Generation Global Enterprise Resource Planning Software", Epicore Vantage, http://m.scala.com.cn downloads/vantage/vantage6Oage.pdf, printed Jan. 12, 2006, 60 pgs.
T. E. Graedel et al., "Hierarchical Metrics for Sustainability", Environmental Quality Management, Winter, 2002, vol. 12 Issue 12, pp. 21-30, Retrieved from Business Source Complete Database.
U.S. Official Action mailed Nov. 5, 2010 in U.S. Appl. No. 11/393,335.
U.S. Official Action mailed Nov. 10, 2010 in U.S. Appl. No. 11/624,122.
U.S. Official Action mailed Nov. 10, 2010 in U.S. Appl. No. 11/668,763.
U.S. Official Action mailed Nov. 24, 2010 in U.S. Appl. No. 11/670,444.
U.S. Official Action mailed Nov. 29, 2010 in U.S. Appl. No. 11/668,520.
U.S. Official Action mailed Dec. 8, 2010 in U.S. Appl. No. 11/214,678.
MrExcel Consulting, Using Excel to Track Student Grades; Nov. 2006;6 pgs. (cited in Oct. 4, 2011 OA).
Kraynak, "Absolute Beginner's Guide to Microsoft Excel 2003", Sep. 2003, Appendix A; 4 pgs. (cited in Oct. 4, 2011 OA)
U.S. Official Action mailed Oct. 4, 2011 in U.S. Appl. No. 11/624,171.
U.S. Official Action mailed Oct. 24, 2011 in U.S. Appl. No. 11/393,335.
U.S. Official Action mailed Nov. 8, 2011 in U.S. Appl. No. 11/670,516.
U.S. Official Action mailed Nov. 9, 2011 in U.S. Appl. No. 11/623,818.
U.S. Official Action mailed Nov. 10, 2011 in U.S. Appl. No. 11/627,640.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.
U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 7, 2011 in U.S. Appl. No. 11/670,516.
U.S. Official Action mailed Jun. 13, 2011 in U.S. Appl. No. 11/668,520.
U.S. Official Action mailed Jun. 24, 2011 in U.S. Appl. No. 11/280,548.
U.S. Official Action mailed Jul. 6, 2011 in U.S. Appl. No. 11/214,678.
U.S. Official Action mailed Jul. 14, 2011 in U.S. Appl. No. 11/668,763.
U.S. Official Action mailed Aug. 8, 2011 in U.S. Appl. No. 11/313,324.
U.S. Appl. No. 13/404,032, filed Feb. 24, 2012 entitled "Concerted Coordination of Multidimensional Scorecards".
U.S. Official Action mailed Mar. 5, 2012 in U.S. Appl. No. 11/623,953.
U.S. Official Action mailed Mar. 12, 2012 in U.S. Appl. No. 11/627,640.

* cited by examiner

GROUPING AND DISPLAY OF LOGICALLY DEFINED REPORTS

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPIs and aggregated KPIs such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

Even with the flexibility offered by a business scorecard building application, users may need the ability to view ancillary information to enable more intelligent consumption of the data offered with scorecard views. Without this functionality, users may be left to either speculate as to the importance or relevance of the information displayed or they may have to browse around outside of the scorecard environment for additional information to accurately assess the meaning and significance of the data presented.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining suitable visual presentation size for a logically defined report, categorizing a plurality of reports based on the visual presentation sizes, and providing a set of user interface controls to select and set properties of the plurality of reports such that the reports can be consumed based on their category. According to some embodiments, the reports may be associated with one or more elements of a scorecard and consumed by the scorecard application or associated reporting applications.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, logically defined reports such as scorecard reports may be categorized based on their visual presentation size, and user controls may be provided for controlling a layout and properties of the reports based on their categorization. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
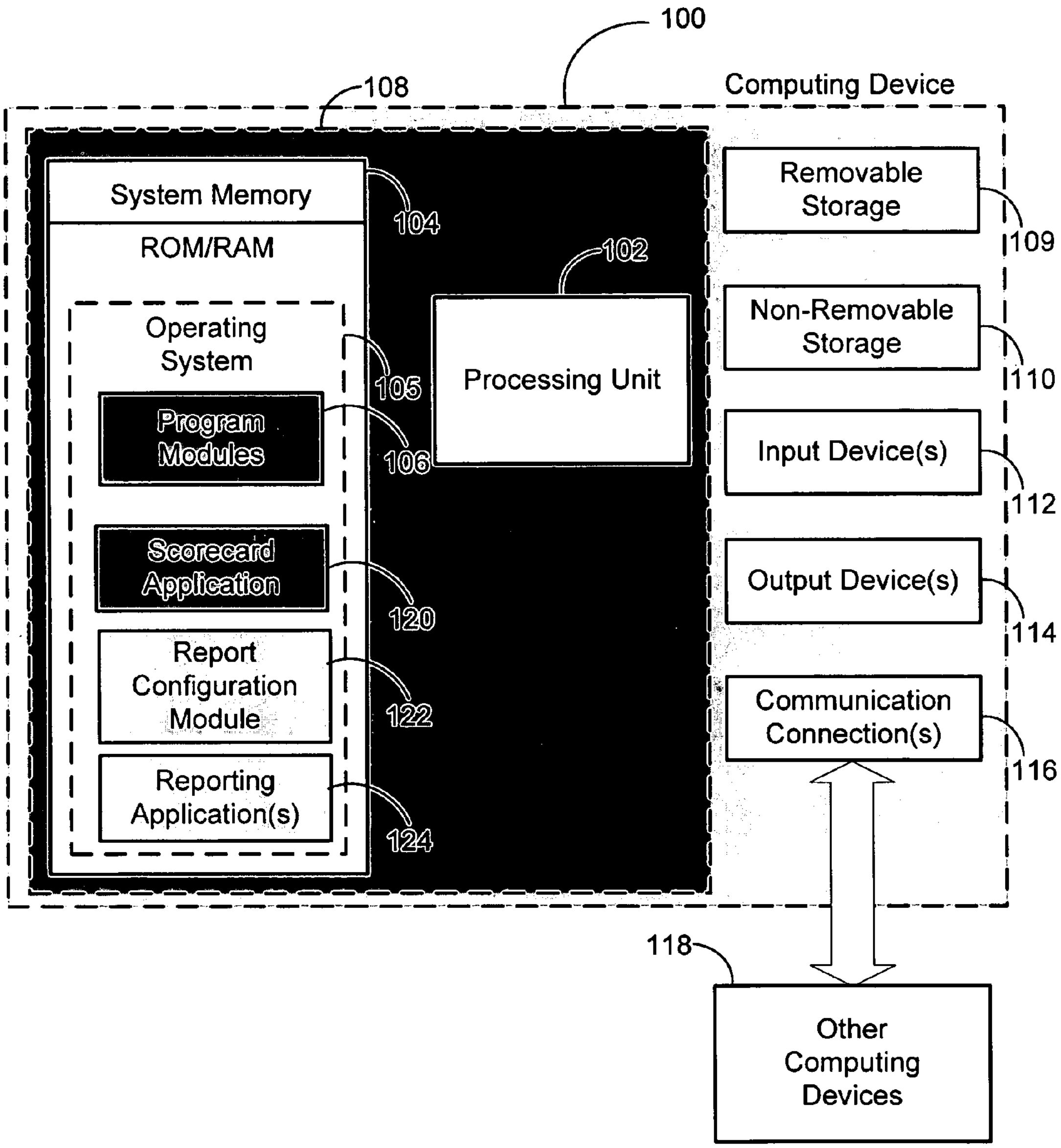
FIG. 1 is a block diagram of an example computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120, report configuration module 122, and reporting application(s) 124. Scorecard application 120 manages business evaluation methods, computes KPIs, and provides scorecard data to reporting applications. In some embodiments, scorecard application 120 may itself generate reports based on metric data.

Report configuration module 122 manages determination of subordinate report definitions for selected scorecard metrics and categorization of available reports such that they can be consumed by the scorecard application 120 or reporting application(s) 124 based on their categories. Report configuration module 122 may be an integrated part of scorecard application 120 or a separate application. Scorecard application 120, report configuration module 122, and reporting application(s) 124 may communicate between themselves and with other applications running on computing device 100 or on other devices. Furthermore, any one of scorecard application 120, report configuration module 122, and reporting application(s) 124 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
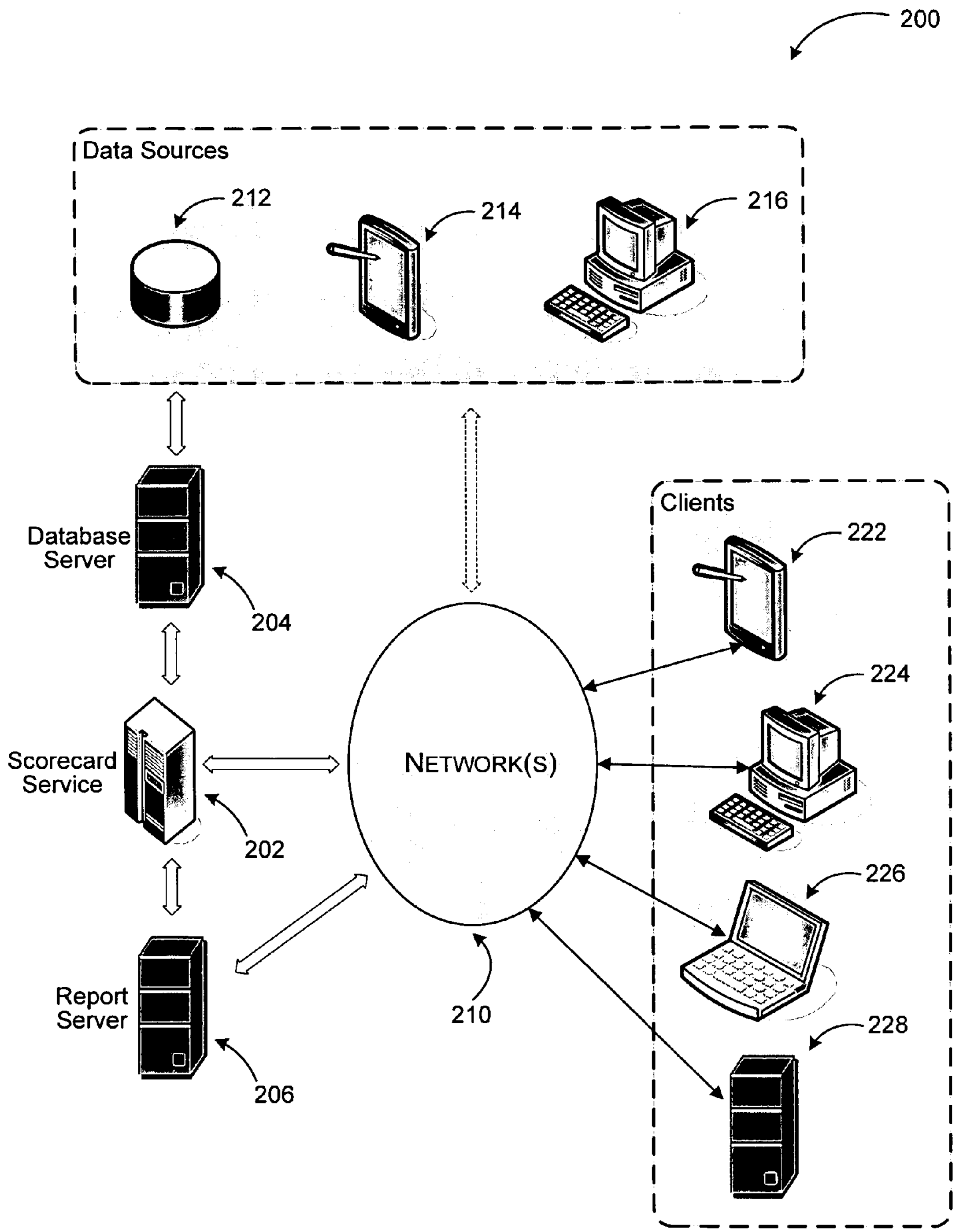
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212, 214, and 216 are examples of a number of data sources that may provide input to scorecard service 202 through database server 204. Additional data sources may include SQL servers, databases, non multi-dimensional data sources such as text files or EXCEL® sheets, multi-dimensional data source such as data cubes, and the like. Database server 204 may manage the data sources, optimize queries, and the like.

Users may interact with scorecard service 202 running the business logic application from client devices 222, 224, 226, and 228 over network(s) 210. In one embodiment, additional applications that consume scorecard-based data may reside on scorecard service 202 or client devices 222, 224, 226, and 228. Examples of such applications and their relation to the scorecard application are provided below in conjunction with FIG. 3.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
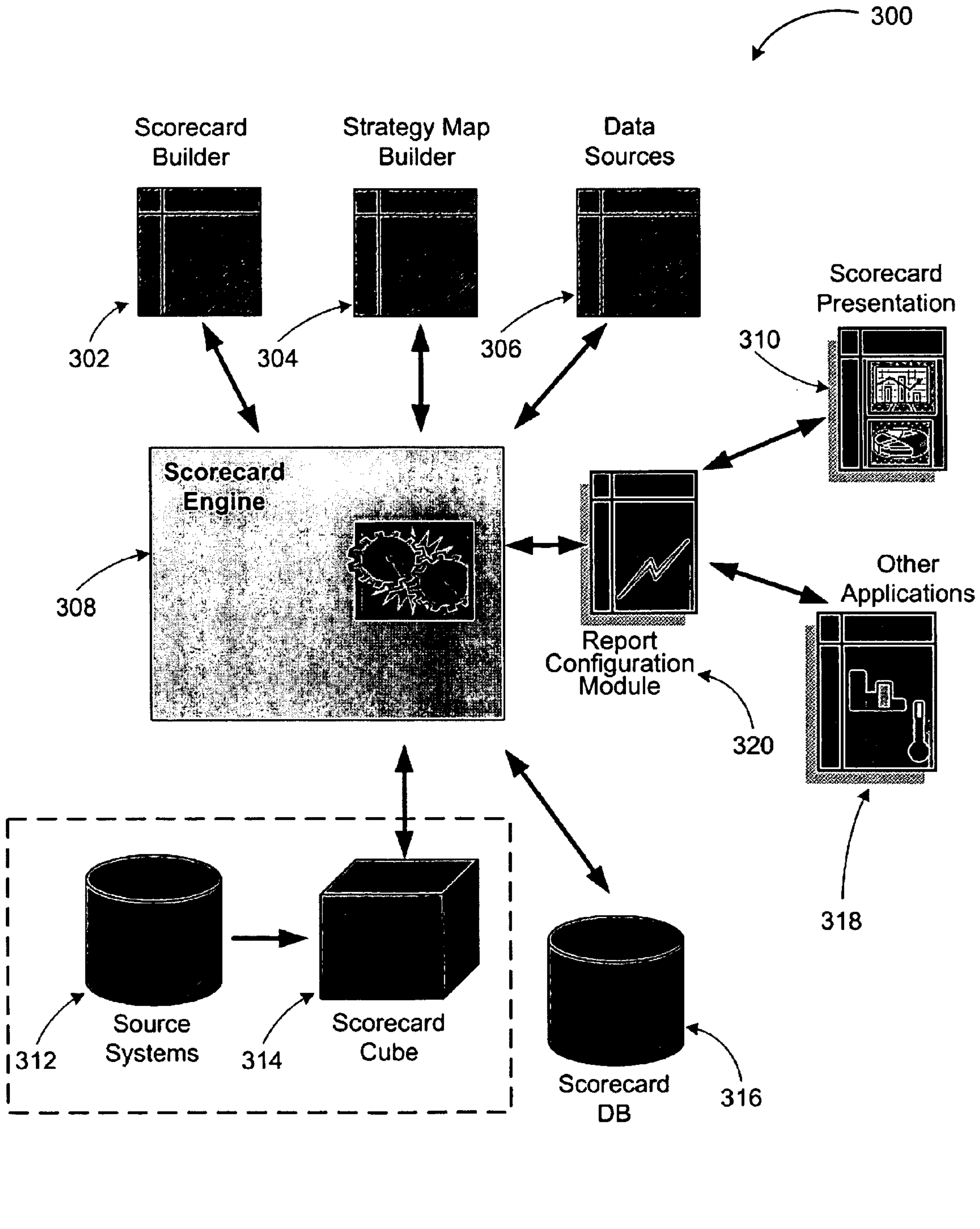
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber credential or a subscriber permission attribute. The report parameter may include a scorecard identifier, a scorecard view identifier, a row identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing redundant back-up database service.

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like.

Strategy map builder 304 is employed for a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)-accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Figure 5:
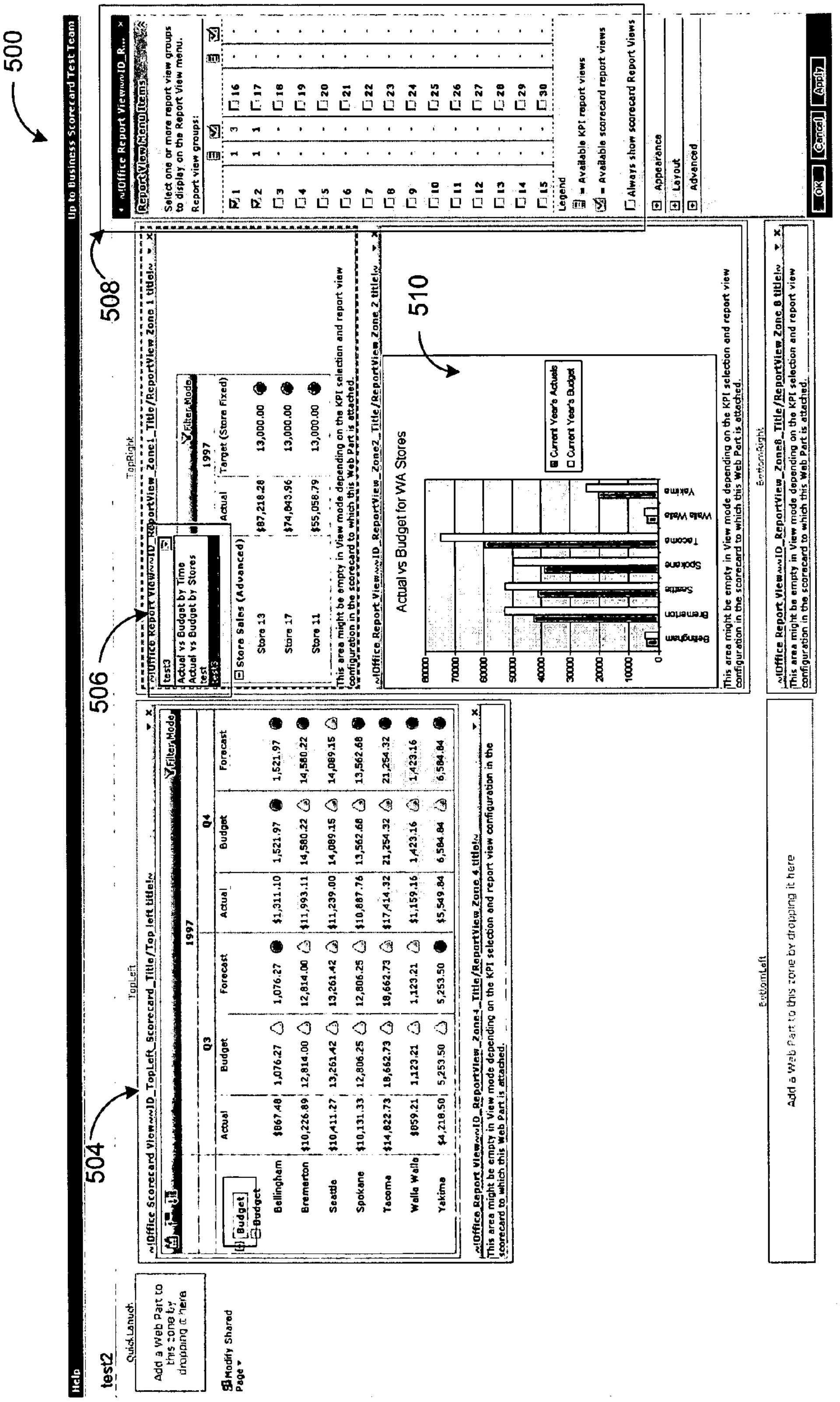
FIG. 5 illustrates a screenshot of a report view User Interface (UI) with a configuration task pane according to embodiments.

Report configuration module 320 is configured to interact with scorecard engine 308, scorecard presentation 310, other applications 318, and manage grouping and display of available reports associated with one or more scorecard elements. Report views offer the user the ability to specify ancillary data views and also view that data in the scorecard viewing experience. The report view definition may be implemented as a metadata-based mapping of logical reports to physical reports for scorecards and KPIs. The report view metadata may include schema, ordering capabilities, and mapping UI (re-use of report views in multiple areas). The report view definition may be rendered to multiple physical display formats and briefing books based on logical definition. If a shared portal web service is the output method, users may customize ancillary views available in the scorecard view using a report view configuration UI as shown in FIG. 5.

Categorization of suitable reports for selected metrics, may include determining presentation size(s) and type(s) for the reports, grouping of the reports based on the presentation size(s) and/or type(s), and assigning designators to each group such that reports can be identified as a member of their corresponding group and consumed based on their group by the scorecard application or a reporting application. Homogeneous and heterogeneous reports may be more easily manageable by grouping them based on their presentation size and/or type.

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber credential or a subscriber permission attribute. Other applications 318 may include a graphical representation application, a database application, a data analysis application, a communications application, an alerting application, or a word processing application.

Figure 4:
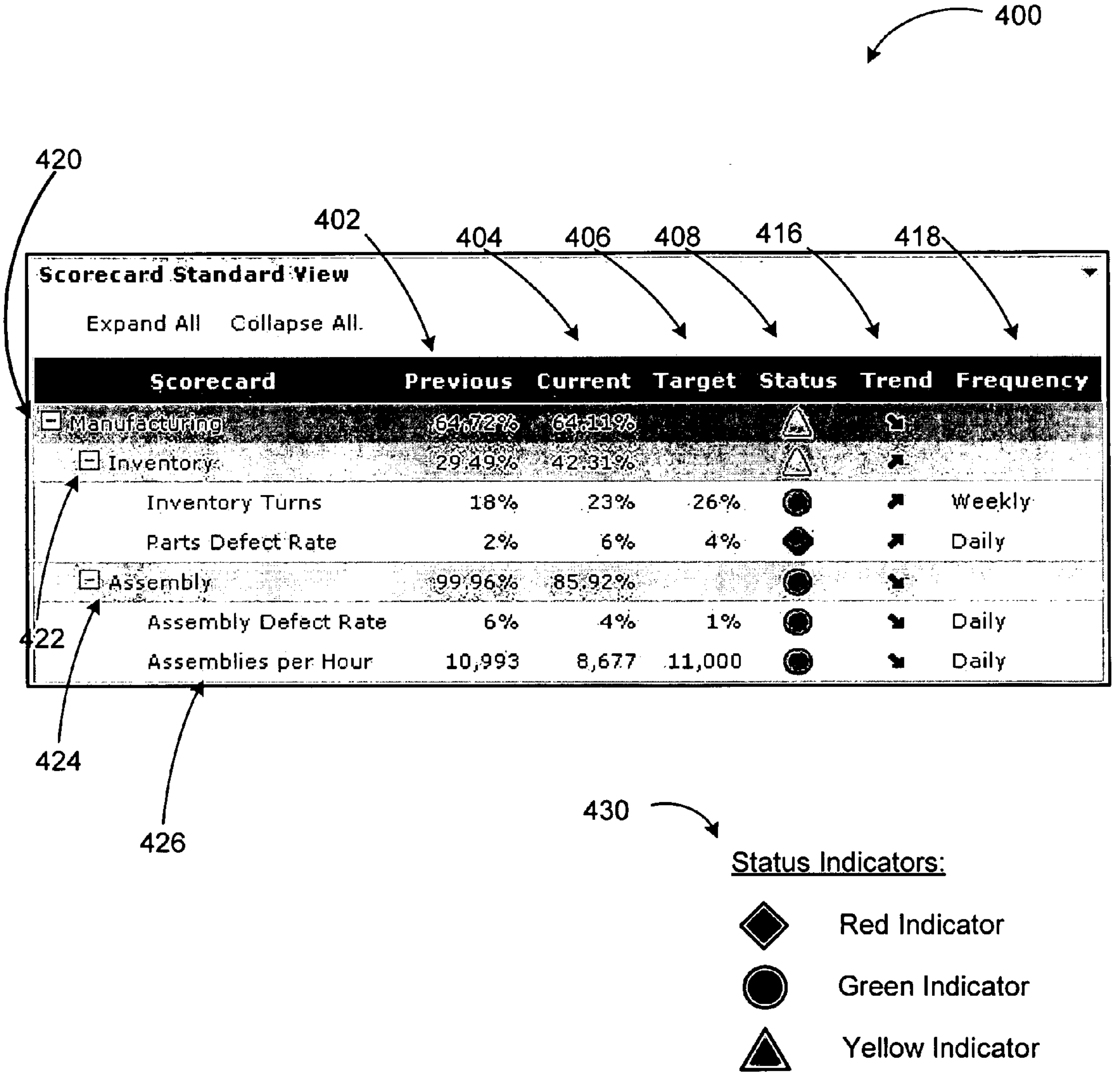
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it along with objective details 426. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

FIG. 5 illustrates screenshot 500 of a report view User Interface (UI) with a configuration task pane according to embodiments. Screenshot 500 includes scorecard view 504, selection view 506, report 510, and report view configuration task pane 508.

Scorecard view 504 presents a typical scorecard with hierarchically ordered elements (KPI's) and selected columns (e.g. different quarters of actuals and targets). Selection view 506 presents selected KPI's for which reports are available. A dropdown menu may provide filtering options for the reports such as combinations of rows and columns (e.g. sales by time, sales by store, etc.). Once a filter is set, available reports are listed for further selection. Report 510 is an example report based on the selected scorecard element(s). In FIG. 5, the example report is a bar chart comparing actuals vs. targets for selected stores. Report view configuration task pane 508 provides a UI for selecting report view groups based on available KPI and scorecard report views.

Screenshot 500 is an example presentation of a scorecard application with report grouping capability. Embodiments are not limited to the example scorecard layouts, report types, views, and user interface controls for managing those described above. Definition and instantiation of report grouping may be provided in many other ways using the principles described herein.

Figure 6:
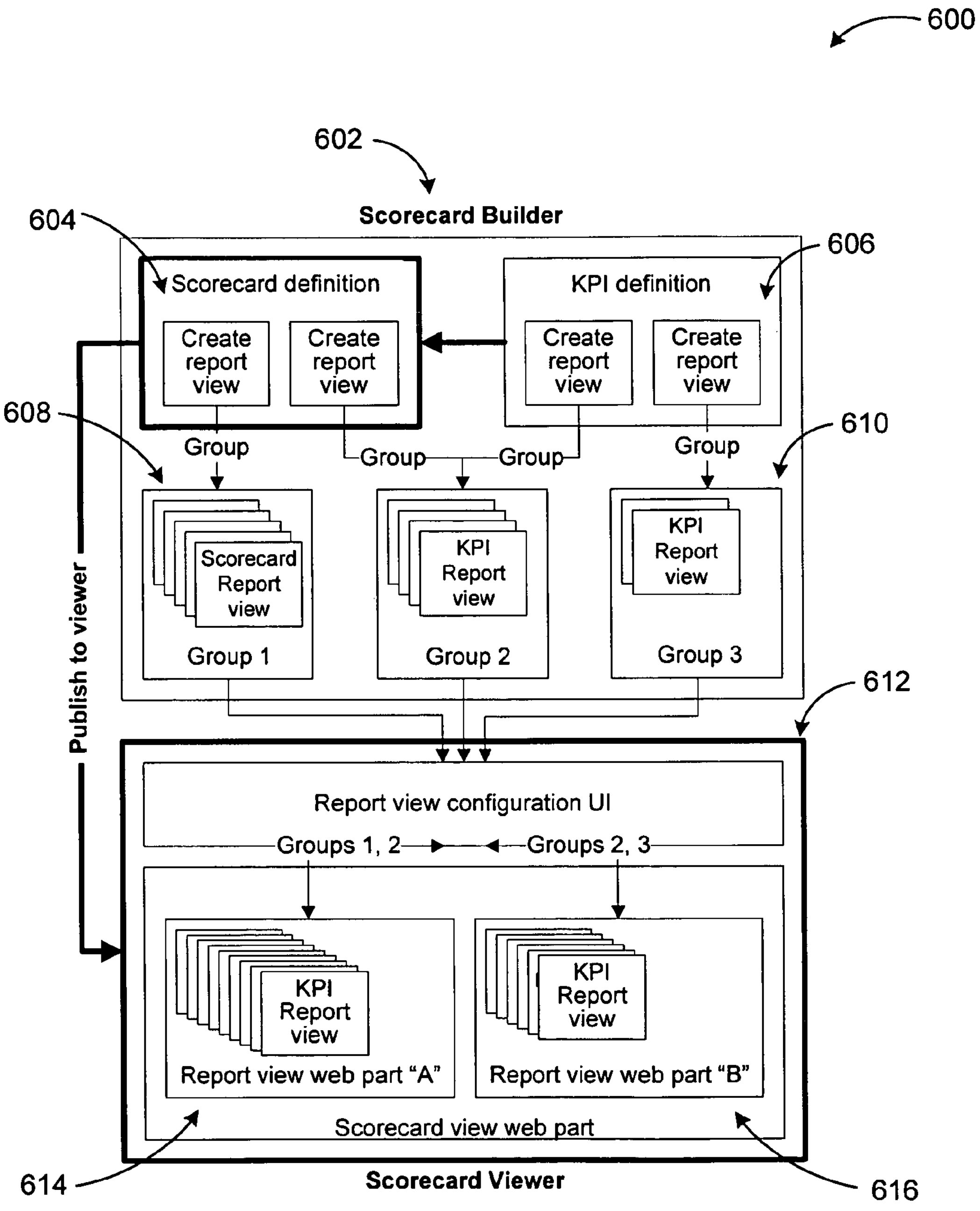
FIG. 6 is a diagram illustrating interactions between different components of a scorecard system for grouping reports in a scorecard viewer.

FIG. 6 illustrates diagram 600 of interactions between different components of a scorecard system for grouping reports in a scorecard viewer. A report configuration module according to embodiments enables a user to logically categorize report view definitions into groups based on their presentation size(s) and/or types during a scorecard definition (604) or KPI definition (606) processes in a scorecard builder (602). A suitable size for each report may be determined based on a computing device capability, a reporting application capability, a report content, or a user preference. The report types may include a map, a chart, one or more comments, an image, a video stream, an audio stream, a transaction list, a table, and the like. The groups (608, 610, etc.) may be named using system defined or user defined numeric or alphanumeric designators (e.g. "1", "5", "tables", "charts", "diagrams", etc.).

The building environment may be configured to display a user-friendly tabular view of all report views for a given KPI or scorecard including the group name (unique ID) as a table column in an associated data grid UI. Furthermore, a report view editing form in the building environment may enable the user to explicitly assign that report view definition to a group.

A resulting scorecard view in scorecard viewer 612 may enable the user to select a KPI and view the related report views (614 and 616) as specified in the scorecard definition 604. Each of the resulting report views may provide an inline dropdown menu control allowing the user to change which report view data to show in a region based on the scorecard report view definition. This control may list the names of the report views as defined in the scorecard report views definition. Both scorecard and KPI report views may be listed as options in the dropdown menu control. A user may be provided options in a dropdown menu to see available scorecard report views and KPI report views. Moreover, the UI may be configured to enable a subscriber to define a report type and a presentation size in addition to a predefined selection of report types and presentation sizes. In another embodiment, report view configuration UI 612 may provide the controls.

Report view configuration UI 612 may include attribute displays, list reports, and the like. Each report view includes information associated with its components in its definition. By grouping the report views based on their presentation sizes and/or types and assigning them to a selected core component, heterogeneous metrics can be handled by the scorecard system in a seamless fashion.

Figure 7:
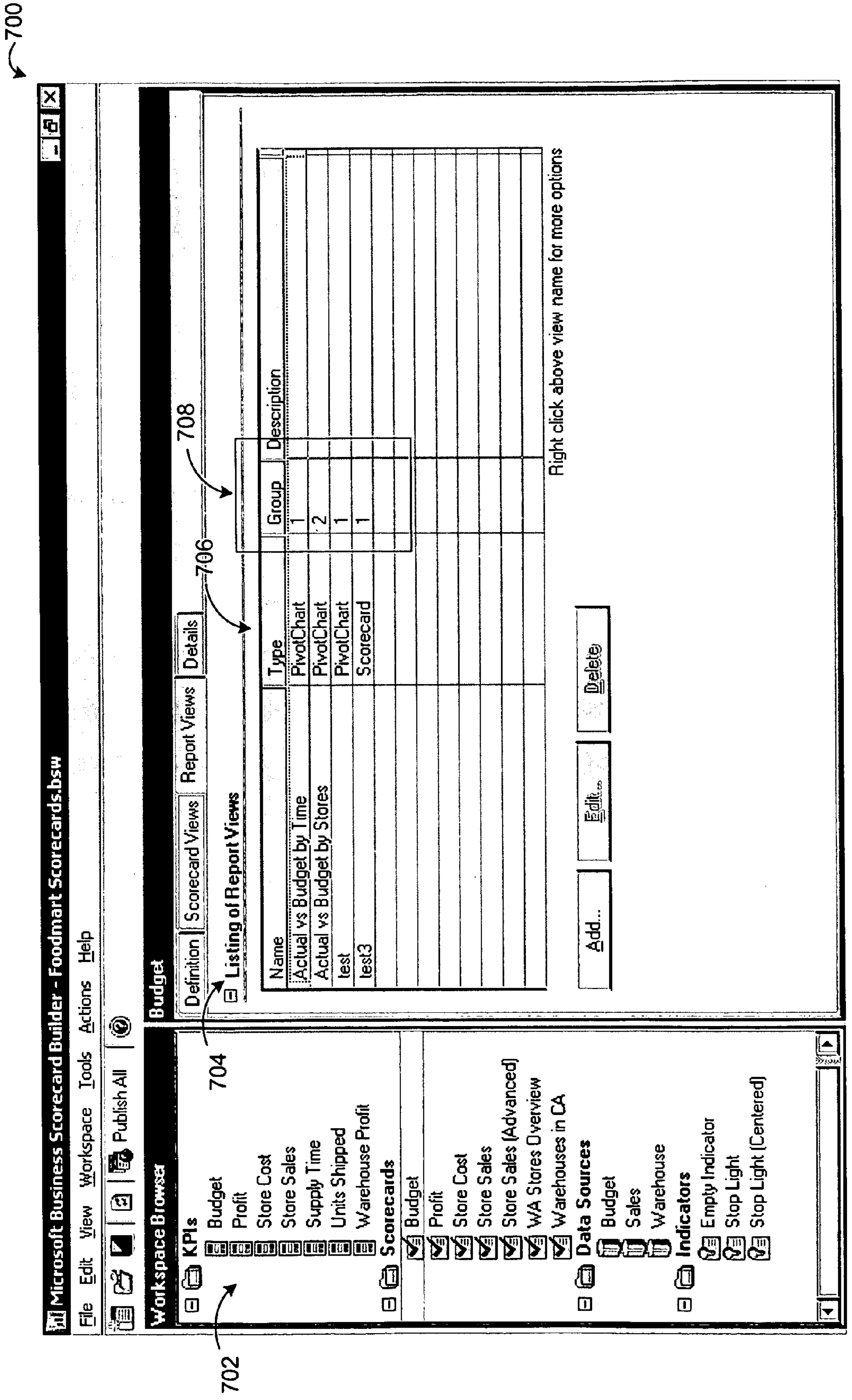
FIG. 7 illustrates a screenshot of an example report view definition UI in a scorecard application.

FIG. 7 illustrates screenshot 700 of an example report view definition UI in a scorecard application. Workspace browser portion 702 of the UI includes a listing of KPIs and scorecards available to a subscriber in the scorecard application. The KPIs and scorecards (as well as other elements such as Objectives) may be presented in a listing tree format, a simple listing format, and any other format known in the art. Workspace browser portion 702 may also include a listing of associated data sources and indicators used in the scorecard views.

Upon selection of one of the items (e.g. Budget) in the workspace browser portion 702, information associated with the selected item is presented in the adjacent portion of the UI. The editor UI may provide information such as details of the selected item, actuals and targets included in the selected KPI or scorecard, configured views of the KPI or scorecard, and report views associated with the selected KPI or scorecard. Listing of report views 704 is an example showing available reports associated with the selected item. As shown in the example screenshot, four reports are available for the selected KPI. Listed attributes of each report view include report type 706, group identification 708, and description. In other embodiments, additional attributes such as appearance, name, owner, last modification date, and the like, may also be listed.

The selected KPI may be assigned the listed report views and their attributes. Furthermore, group properties may also be changed in this editor enabling user-specified assignment of report views to groups other than the predefined ones.

Figure 8:
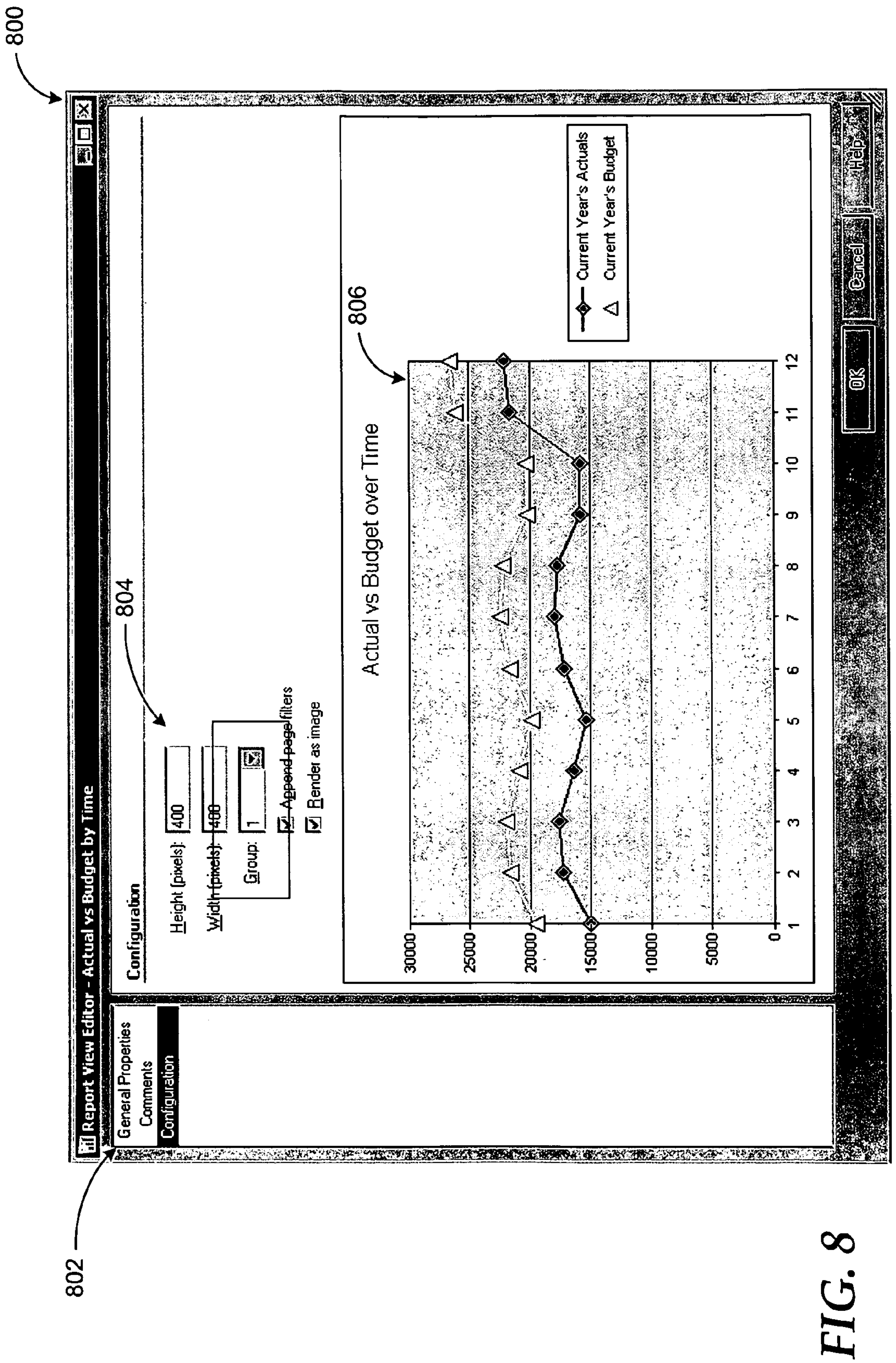
FIG. 8 illustrates a screenshot of example report view properties editor after the scorecard is published.

FIG. 8 illustrates screenshot of example report view properties editor 800 after the scorecard is published. Portion 802 of report view properties editor 800 includes a listing of editable items such as general properties, comments, or configuration(s). Portion 804 includes report view properties that may be modified by the user once the scorecard is published. Examples of such properties include height and width assigned to the report presentation (in this case a chart), group assignment, rendering type, and the like. The report itself is rendered in portion 806 as a chart of actuals vs. budget over time. As mentioned previously, default selections assigned by the scorecard application may be modified by the user employing this UI. Rendered report views may be dynamically updated to present user modifications. According to one embodiment, the report view attributes may be modified depending on a permission level of the subscriber.

Figure 9:
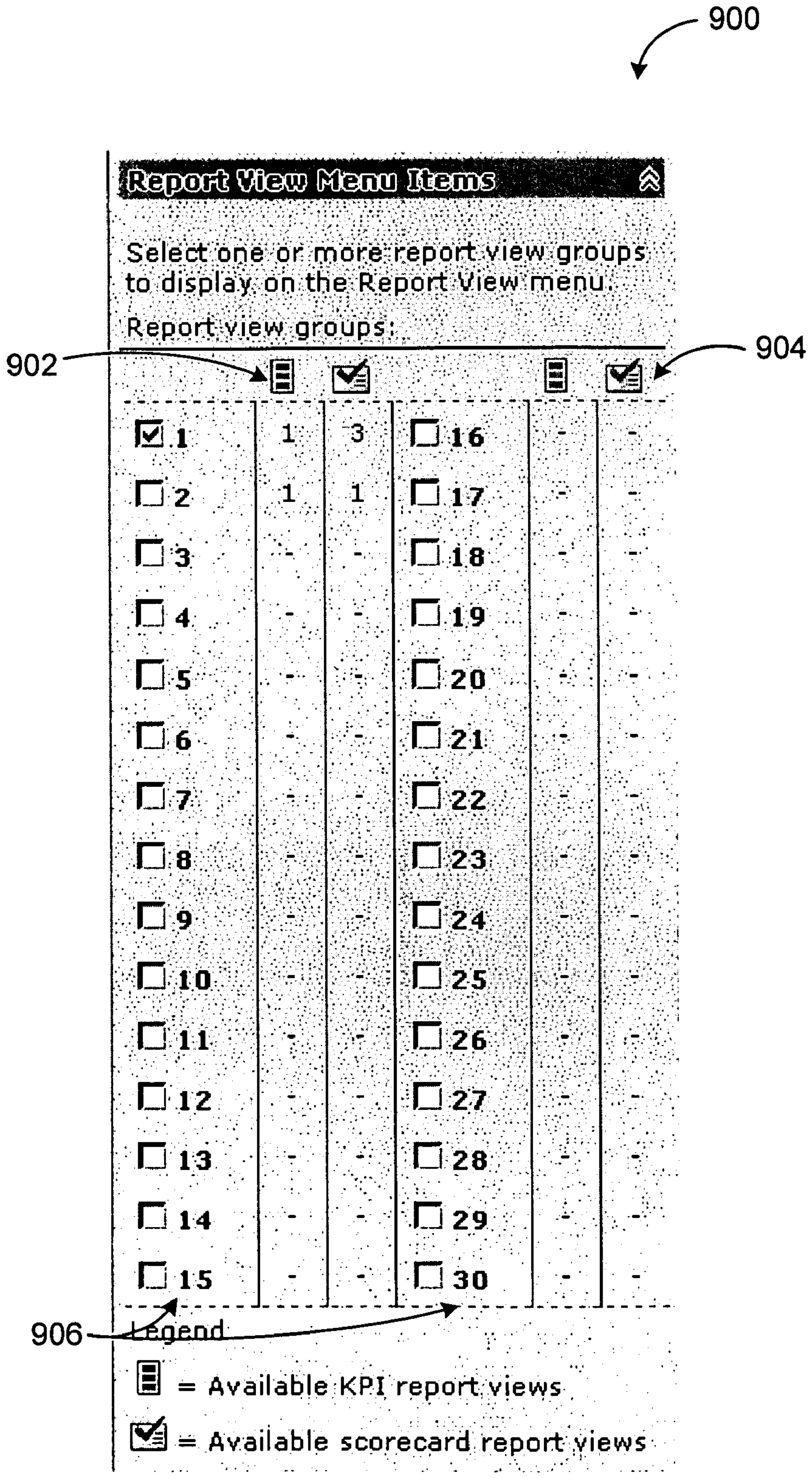
FIG. 9 illustrates a screenshot of an example report view configuration task pane in a scorecard application.

FIG. 9 illustrates a screenshot of example report view configuration task pane 900 in a scorecard application. According to some embodiments, the user may be enabled to open report view configuration task pane 900 and view how many scorecard and KPI report views are available for that scorecard. Each report view groups may be associated with either a KPI 902 and/or a Scorecard 904 via a checkbox in each of the respective columns 906. The UI may be configured to present visually if and how many report views are present for each group. The user may then select groups by clicking the appropriate check box for each desired group. The selected report data may then be consumed by the scorecard application or another application by generating a report, storing a report, performing a query involving the report, and the like.

While the configuration UI is shown as a task pane, embodiments are not so limited. Other forms of the UI such as a pop-up display, a hover-over display, and a dropdown menu may be implemented using the principles described herein. According to some embodiments, the UI may be configured to provide the listing of available reports and manage the attribute of each report based on a subscriber credential or permission.

Furthermore, the example implementations of report views, scorecards, and UIs in FIGS. 5 through 9 are intended for illustration purposes only and should not be construed as a limitation on embodiments. Other embodiments may be implemented without departing from a scope and spirit of the invention.

Figure 10:
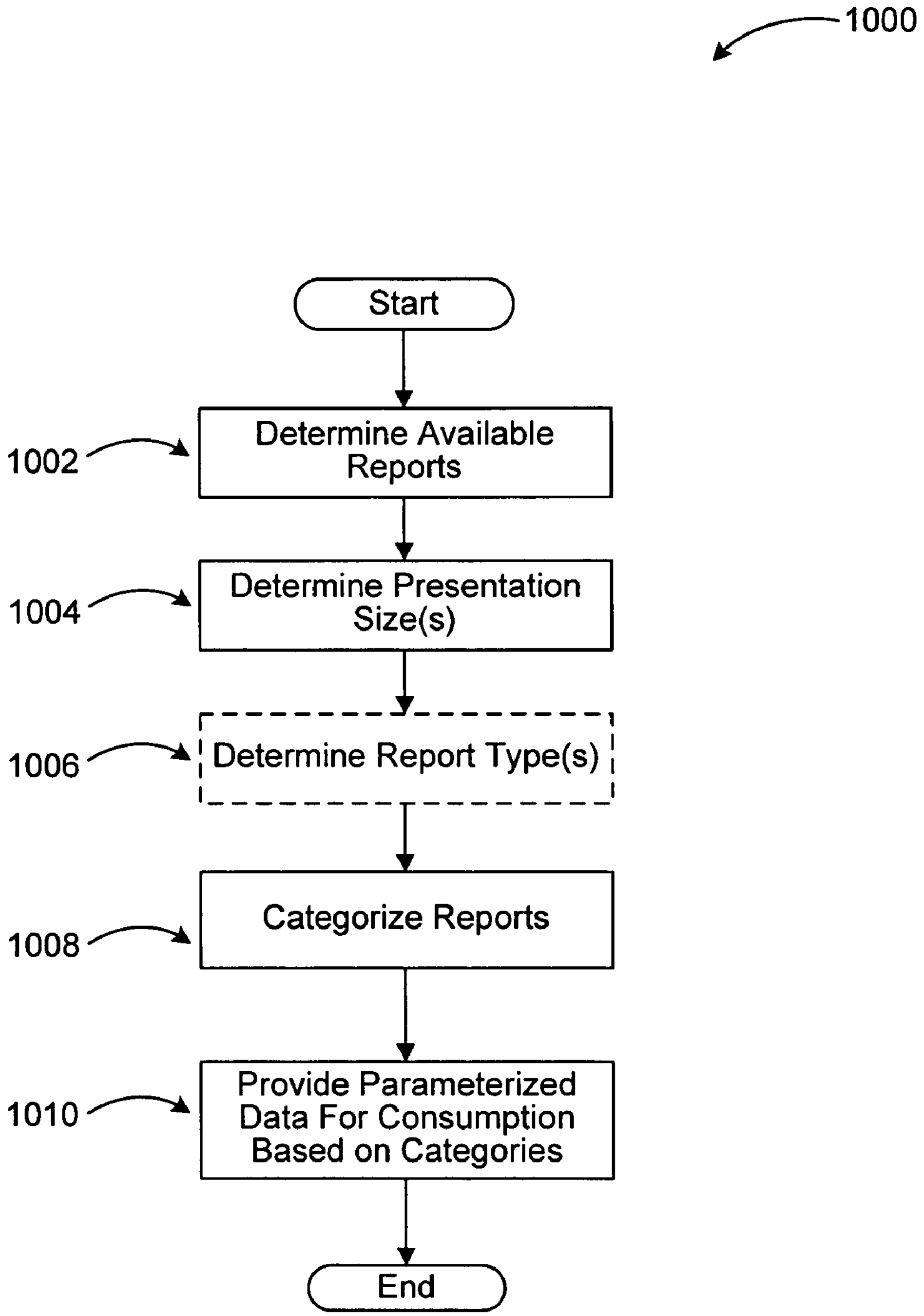
FIG. 10 illustrates a logic flow diagram for a process of grouping and display of report views in a scorecard application.

FIG. 10 illustrates a logic flow diagram for a process of grouping and display of logical reports. Process 1000 may be implemented in a business logic application such as a scorecard application as described in FIGS. 1 and 2.

Process 1000 begins with operation 1002, where available reports are determined. Available reports are determined based on an evaluation of suitable reports for selected scorecard elements such as KPIs, Objectives, and the like. Processing advances from operation 1002 to operation 1004.

At operation 1004, a presentation size for each report is determined. The presentation size for each report may be determined based on a computing device capability, a reporting application capability, a report content, a user preference, and the like. Processing moves from operation 1004 to optional operation 1006.

At optional operation 1006, a report type is determined. The report type for the data included in the element, features of a report presentation layout associated with the report, and the like, may also be taken into consideration when determining the available reports and categorizing. Processing proceeds from optional operation 1006 to operation 1008.

At operation 1008, the reports are categorized based on their presentation size and/or type. Categorized reports may be assigned group names (e.g. numeric or alphanumeric designators) and consumed based on their categorization. Predefined group assignments may be modified based on user selection(s). Processing moves from operation 1008 to operation 1010.

At operation 1010, parameterized data associated with the categorized report views is provided to the scorecard application or other reporting applications for consumption. The report data may be consumed in form of generating a report, storing a report, performing a query, updating an existing report, and the like. After operation 1010, processing moves to a calling process for further actions.

The operations included in process 1000 are for illustration purposes. Grouping and displaying logical reports in a scorecard application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for grouping logically defined reports, the method comprising:

determining a plurality of logically defined reports;

determining a suitable presentation size for each of the plurality of logically defined reports, wherein determining the suitable presentation size for each of the plurality of logically defined reports comprises determining the suitable presentation size based at least in part on a reporting application capability;

categorizing, by the computing device, each of the plurality of logically defined reports based on the presentation size for each report, wherein categorizing each of the plurality of logically defined reports allows for consuming each report based on its category;

receiving a modification to at least one of the plurality of logically defined reports, the modification corresponding to a change in a grouping property of the at least one logically defined report, the grouping property comprising a group name property, a presentation size property, and a report type property; and dynamically updating the categorization of the at least one logically defined report based on the received modification.

2. The method of claim 1, further comprising:

assigning one of a numeric attribute and alphanumeric attribute to each report based on its category.

3. The method of claim 1, further comprising:

determining a type of each of the plurality of logically defined reports; and categorizing each of the plurality of logically defined reports based on their type.

4. The method of claim 3, wherein determining the type of each of the plurality of defined reports includes determining the type of each report including one of: a map, a chart, one or more comments, an image, a video stream, an audio stream, and a transaction list.

5. The method of claim 1, wherein consuming each report includes at least one from a set of: generating each report, storing each report, and performing a query using each report.

6. The method of claim 1, further comprising:

providing a User Interface (UI) for managing an attribute associated with each report from a set of: a property, a layout, an order, and a mapping of each report in a report view screen.

7. The method of claim 6, wherein providing the UI comprises providing the UI configured to provide a listing of available reports grouped by their corresponding categories.

8. The method of claim 7, wherein providing the UI comprises presenting the UI as one of a task pane, a pop-up display, a hover-over display, and a dropdown menu.

9. The method of claim 7, wherein providing the UI comprises providing the UI configured to provide the listing of available reports and manage the attribute of each report based on a subscriber credential.

10. The method of claim 7, wherein providing the UI for managing the attribute associated with each report comprises including the attribute of each report in report view metadata in a parameterized form.

11. The method of claim 6, further comprising:

providing the report view screen based on selections made through the UI.

12. The method of claim 1, wherein determining the suitable presentation size for each report is further based on at least one from a set of:

a computing device capability, a report content, and a user preference.

13. The method of claim 1, wherein determining the plurality of logically defined reports comprises determining the plurality of logically defined reports associated with at least one element of a scorecard.

14. A computer-readable storage medium having computer executable instructions which when executed performs a method for managing parameterized subordinate reports in a scorecard system, the method executed by the computer executable instructions comprising:

determining a plurality of reports associated with an element of a scorecard;

determining a suitable presentation size for each of the plurality of reports, wherein determining the suitable presentation size for each of the plurality of reports is based at least in part on at least one of the following: a reporting application capability and a content of each report;

determining a type for each of the plurality of reports;

categorizing each of the plurality of reports based on the type of each report and the presentation size for each report, wherein categorizing each of the plurality of logically defined reports allows for consuming each report based on its category; and providing a User Interface (UI) for managing at least one attribute associated with each report; and receiving a modification to a grouping attribute of at least one of the plurality of logically defined reports, the grouping attribute comprising a group identifier; and dynamically updating the categorization of the at least one logically defined report based on the received modification to the grouping attribute.

15. The computer-readable storage medium of claim 14, wherein providing the UI comprises providing the UI configured to enable a subscriber to define the report type and the presentation size in addition to a predefined selection of report types and presentation sizes.

16. The computer-readable storage medium of claim 14, wherein the instructions further comprise creating groups of subordinate reports based on report categories.

17. A system for managing logically defined reports in a scorecard system, the system comprising:

a computing device comprising a memory storage and a processing unit;

a scorecard application configured to compute scorecard metrics and provide a scorecard presentation based on the computed scorecard metrics; and a report configuration module configured to:

determine a number of available report definitions for a scorecard element based on a type of data associated with the scorecard element;

determine a presentation size associated with each available report by determining a reporting capability of the scorecard application;

categorize the available report definitions based on their presentation sizes; and provide a set of user interface controls for visualizing and managing contents and layout of the available reports, wherein the set of user interface controls for visualizing and managing the contents and the layout of the available reports are operative to:

allow a subscriber to change which report view data to show in a region based on an associated report definition, and update the categorization of the report view data based on a change to the associated report definition.

18. The system of claim 17, wherein the report configuration module is further configured to provide a physical instantiation of each category of the available reports for generating a report view screen.

19. The system of claim 17, wherein the report configuration module is further configured to parameterized attributes of each available report to a reporting application.

20. The system of claim 17, wherein the report configuration module is integrated with the scorecard application.

* * * * *